United States Patent
Corrion et al.

(10) Patent No.: US 11,283,873 B2
(45) Date of Patent: Mar. 22, 2022

(54) IOT SENSOR FUSION

(71) Applicant: Intel Corporation, Santa Clara, CA (US)

(72) Inventors: Bradley William Corrion, Chandler, AZ (US); Micah J. Sheller, Hillsboro, OR (US); Jeffrey Sedayao, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 481 days.

(21) Appl. No.: 16/087,965

(22) PCT Filed: Apr. 1, 2016

(86) PCT No.: PCT/US2016/025736
§ 371 (c)(1),
(2) Date: Sep. 24, 2018

(87) PCT Pub. No.: WO2017/171876
PCT Pub. Date: Oct. 5, 2017

(65) Prior Publication Data
US 2020/0322434 A1 Oct. 8, 2020

(51) Int. Cl.
*H04W 4/70* (2018.01)
*H04L 67/12* (2022.01)
(Continued)

(52) U.S. Cl.
CPC .............. *H04L 67/12* (2013.01); *G01P 13/00* (2013.01); *G01P 15/00* (2013.01); *G01S 19/01* (2013.01);
(Continued)

(58) Field of Classification Search
CPC ...... H04L 67/12; H04W 4/027; H04W 4/029; H04W 4/70; H04M 1/72451; G01P 13/00;
(Continued)

(56) References Cited

U.S. PATENT DOCUMENTS 8,665,087 B2 3/2014 Greene et al.
2005/0068171 A1 3/2005 Kelliher
(Continued)

FOREIGN PATENT DOCUMENTS

WO WO-2015048683 A1 4/2015
WO WO-2017171876 10/2017

OTHER PUBLICATIONS

"Gemalto delivers IoT smart data to emergency responders throughout the U.S.", Gemalto. [Online], Retrieved from the Internet: <URL: http://www.gemalto.com/press/Pages/Gemalto-delivers-IoT-smart-data-to-emergency-responders-throughout-the-US.aspx>, (Oct. 21, 2015), 2 pgs.

(Continued)

*Primary Examiner* — Brian P Cox
(74) *Attorney, Agent, or Firm* — Schwegman Lundberg & Woessner, P.A.

(57) ABSTRACT

Various systems and methods for Internet of Things (IoT) network sensor fusion are provided herein. A system for providing sensor collaboration includes: a sensor command circuit to access first-tier sensor data from a first-tier sensor associated with a user; a risk assessment circuit to use the first-tier sensor data to determine a risk rating, the risk rating representing a potential risk to the user; a user context circuit to determine a user context from the first-tier sensor data, wherein the user context circuit and the sensor command circuit are to selectively access second-tier sensor data from a second-tier sensor based on the user context; and a rule evaluation circuit to access a rule database to identify a rule corresponding to the risk rating and user context, and execute the rule when the rule is identified.

23 Claims, 4 Drawing Sheets

(51) Int. Cl.
| | |
|---|---|
| *H04W 4/029* | (2018.01) |
| *G06F 16/2457* | (2019.01) |
| *G01P 13/00* | (2006.01) |
| *G01P 15/00* | (2006.01) |
| *G01S 19/01* | (2010.01) |
| *H04W 4/02* | (2018.01) |
| *H04M 1/72451* | (2021.01) |
| *G16Y 40/50* | (2020.01) |
| *G16Y 10/60* | (2020.01) |

(52) U.S. Cl.
CPC .. *G06F 16/24575* (2019.01); *H04M 1/72451* (2021.01); *H04W 4/027* (2013.01); *H04W 4/029* (2018.02); *H04W 4/70* (2018.02); *G16Y 10/60* (2020.01); *G16Y 40/50* (2020.01)

(58) Field of Classification Search
CPC ......... G01P 15/00; G01S 19/01; G16Y 10/60; G16Y 40/50; G06F 16/24575
See application file for complete search history.

(56) References Cited

U.S. PATENT DOCUMENTS

| | | |
|---|---|---|
| 2011/0190650 A1 | 8/2011 | Mcnair |
| 2014/0148733 A1 | 5/2014 | Stone et al. |
| 2015/0160015 A1* | 6/2015 | DeWeese ............... H04W 4/021 701/526 |
| 2015/0265170 A1 | 9/2015 | Wisløff et al. |
| 2015/0289821 A1 | 10/2015 | Rack-gomer et al. |
| 2017/0149980 A1* | 5/2017 | Aberg ............... H04M 3/42348 |
| 2017/0337339 A1* | 11/2017 | Cronin ................ A61B 5/0022 |
| 2018/0000346 A1* | 1/2018 | Cronin ................ A61B 5/6801 |

OTHER PUBLICATIONS

"International Application Serial No. PCT/US2016/025736, International Search Report dated Dec. 22, 2016", 3 pgs.

"International Application Serial No. PCT/US2016/025736, Written Opinion dated Dec. 22, 2016", 6 pgs.

Mcmanus, Ryan, "Smart Personal Protection: How The Next Generation of Smart Devices Will Enable Everywhere Security™.", Defender24/7, (May 2015), 10 pgs.

Patel, Shyamal, et al., "A review of wearable sensors and systems with application in rehabilitation", Journal of NeuroEngineering and Rehabilitation 9(21), (2012), 17 pgs.

"International Application Serial No. PCT US2016 025736, International Preliminary Report on Patentability dated Oct. 11, 2018", 8 pgs.

* cited by examiner

IOT SENSOR FUSION

TECHNICAL FIELD

Embodiments described herein generally relate to networking and in particular, to Internet of Things (IoT) network sensor fusion.

BACKGROUND

According to some technical analysts, there will be over 50 billion connected "things" by the year 2020. This will completely transform current infrastructures and will drive new innovations in industry, products, and services. Internet of Things (IoT) is term that represents devices and systems that communicate over a network, such as the Internet. The IoT is a network of physical objects or "things" embedded with electronics, software, and sensors that enables these objects to collect and exchange data between themselves and between other computing devices. Example "things" include connected home appliances, sensors in automobiles, biochips, public cameras, wearable devices, and the like. Standards groups have begun the process of formulating standards that specify procedures for device discovery, communications between devices, service discovery, security, and other procedures used in forming and maintaining IoT networks. Example groups include the Open Connectify Foundation (OCF), Internet Protocol for Smart Objects (IPSO) Alliance, and the Industrial Internet Consortium.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

IoT may be described as a 'network of networks' where devices utilize underlying communications networks and technologies such as the Internet to communicate, but form their own logical networks of IoT devices (called nodes). These logical networks of IoT devices may be referred to as an IoT realm. In some examples, two or more disparate IoT realms may combine to form a larger realm referred to as a super-realm. The current techniques used to form these super-realms involves the use of gateways or cloud servers which take on the role of emulating, virtualizing, and representing the operation of the disparate realms outside the gateway. For example, the gateways, while serving as connectivity bridges are often tasked with the additional tasks of providing realm services that allow secure access to resources controlled by IoT nodes. These realm services include key management, access management, network operations, provisioning, node and resource discovery, and the other realm services to facilitate communication amongst the nodes of the realm.

As noted above, the prevalence of IoT devices is increasing. IoT devices may contain a variety of sensors (e.g., cameras, microphones, global positioning systems (GPS), telemetry, etc.) for a variety of purposes, such as a camera and microphone on a television set to allow video conferencing. Many of these sensors provide environmental information that may be used to observe a person.

Disclosed herein are systems and methods that provide an improved personal monitoring system that selectively integrates personal and public IoT devices. While there are some personal monitors, such as fall detectors, heart monitors, and other similar devices, they are not capable of enlisting additional sensors and device in an ad hoc manner, and incorporating data from such devices to build a rich context. The present devices and processes integrate data from personal devices (e.g., a fitness monitor) with data from public devices (e.g., a security camera). In response to a triggering event and based on rules, the personal device may call for more data from other personal devices or from public devices. With data from multiple IoT devices, the calling device is able to analyze the data holistically and then interface with the user appropriately.

Figure 1:
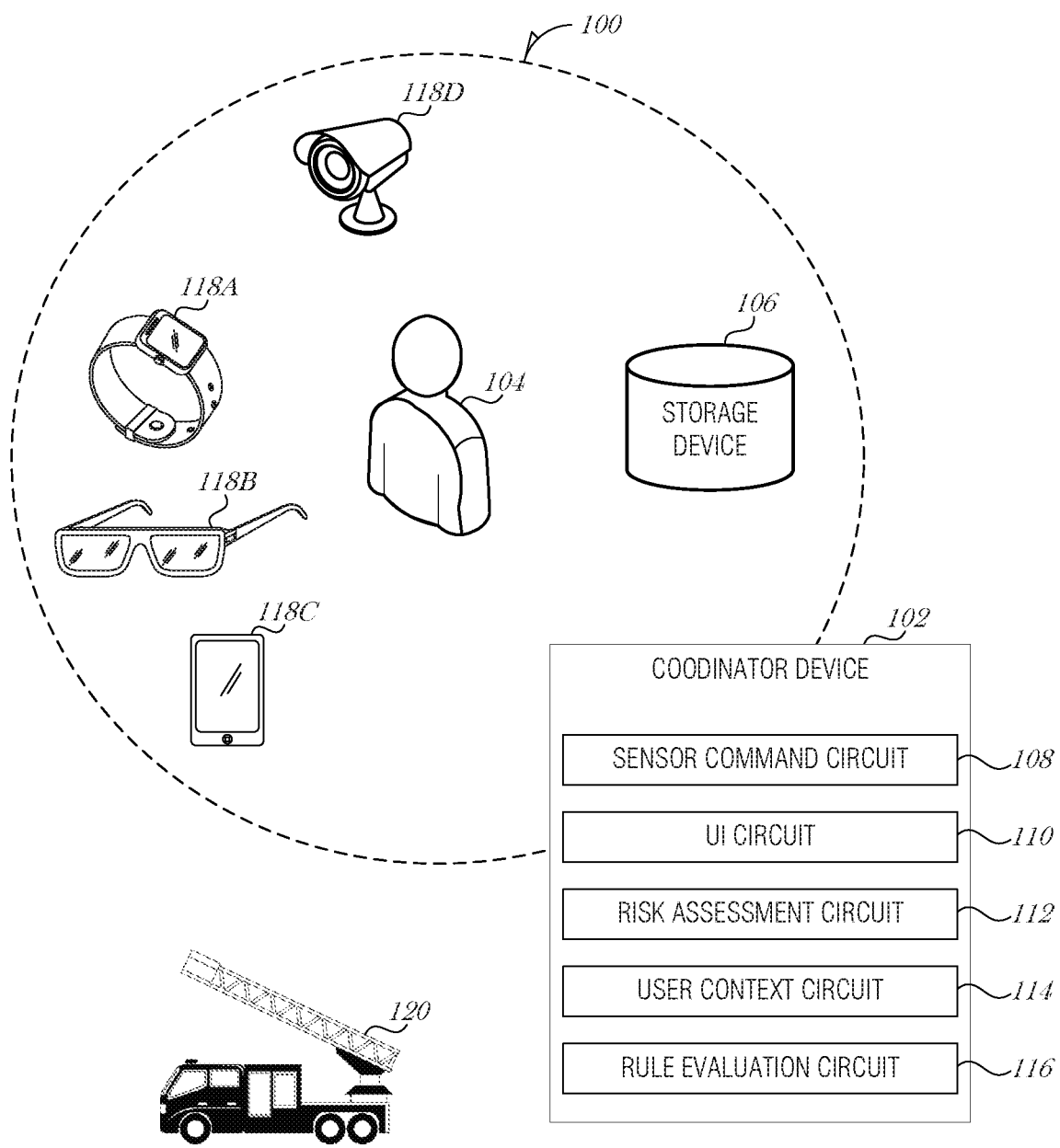
FIG. 1 is a schematic diagram illustrating a personal IoT cloud, according to an embodiment.

FIG. 1 is a schematic diagram illustrating a personal IoT cloud 100, according to an embodiment. The personal IoT cloud 100 includes a coordinator device 102 operated by a user 104, which may receive data from various devices in the personal IoT cloud 100. The coordinator device 102 may interface with a storage device 106 to store or retrieve sensor data, user preferences, historical information, maps, and other suitable information to build contextual information, identify and evaluate rules, communicate with third parties (e.g., emergency response personnel), or perform other functions described in this document. The coordinator device 102 may include various functional elements, which may be configured as circuits, modules, or other programmatic devices, to temporarily or permanently configure the coordinator device 102 in a manner to perform the functions described herein. In various embodiments, the coordinator device 102 may include a sensor command circuit 108, a user interface circuit 110, a risk assessment circuit 112, a user context circuit 114, and a rule evaluation circuit 116. The coordinator device 102 may be a dedicated device or may be incorporated into another device operated by the user 104 (e.g., a smartphone).

Various sensing devices 118 may be included in the personal IoT cloud 100. For example, the user 104 may be wearing a smartwatch 118A, smartglasses 118B, or have a smartphone 118C. These devices 118A, 118B, 118C (collectively referred to as 118) are considered to be members of the user's personal device collection (PDC). A PDC include devices that a person is wearing or carries with them, either in a pocket, purse, or the like. While there is no requirement that devices in a PDC have to be connected, a PDC may have two or more devices that are communicatively coupled, such as the smartphone 1184C and the smartwatch 188A to share data and have one act as a user interface for the other.

Devices that are connected may be considered a part of a body area network (BAN) or a personal area network (PAN).

Additional sensing devices may include a surveillance camera 118D or environmental sensors that are built into a building, a vehicle, or other object that the user 104 is near, occupying, or using. Examples of built-in sensing devices include a thermometer in a vehicle, a camera in an elevator, a door access card reader, or a microphone on a laptop computer.

It is understood that the sensing devices 118 illustrated in FIG. 1 are illustrative, and that the actual type and number of sensing devices may vary and include worn device, biometric devices, fixed-place public sensors, and other sensors operable to sense temperature, illumination, sound, proximity, touch, movement, acceleration, orientation, tilt, condition change or presence of wireless communication signals, whether the lights are on the in structure, listen for sound emanating inside and/or outside the structure, sense condition changes in apparatuses (e.g., vehicles, appliances, air conditioning systems, computing equipment, manufacturing machinery, etc.) or even an organic body, etc.

The coordinator device 102 acts to collect or obtain sensor data from sensing devices 116 in the user's personal IoT cloud 100, process the sensor data to determine a state of an object or person, and determine a responsive action based on the state of the object or person. The coordinator device 102 may obtain sensor data from one or more devices in the user's personal IoT cloud 100, from one or more other personal IoT clouds of other users, from sensing devices 118, use sensor data individually or collectively, and determine a responsive action.

The coordinator device 102 uses a cascading sensor fusion mechanism. The coordinator device 102 first uses sensor data from local sensors, which may be housed with the coordinator device 102 or remote from the coordinator device 102. Depending on the sensor data and relevant rules, the coordinator device 102 may access or request additional sensor data from a second tier of sensors, which may be housed with the coordinator device 102 or remote from the coordinator device 102. This cascading approach may continue to a tertiary, quaternary (e.g., forth level), quinary (e.g., fifth level), senary (e.g., sixth level), and further sensor tiers. By arranging sensors into tiers and accessing those tiers in a selective fashion, outer tiers may only be called upon in certain instances, which may result in power savings, computational savings, network bandwidth efficiencies, and the like.

In an example, devices that are being held, worn, or used by the user 104 may be considered first-tier sensors and accessible to determine an initial evaluation of the user's context, health, situation, or the like. Based on rule evaluation, second-tier sensors may be accessed, such as sensors in public use, like a security camera mounted on a building. As another example, sensors built into the coordinator device 102 may be considered first-tier sensors and other sensors may be arranged as second, third, etc. tier sensors. As yet another example, sensor tiers may be partially or fully configurable by the user 104. Tiers may be arranged by function (e.g., biometric sensors, environmental sensors, apparatus state sensors, etc.), by power consumption, by computational consumption, by network bandwidth requirements, or other arrangements.

In operation, the coordinator device 102 accesses sensor data using the sensor command circuit 108. Sensors may be registered in a sensor database and accessed by the sensor command circuit 108 periodically, regularly, or on-demand. The sensor command circuit 108 may broadcast a discovery protocol message to determine the existence, type, location, or other aspects of sensor devices in proximity to the coordinator device 102. The sensor devices that are discovered may be logged in the sensor database for later use. The sensor database may be stored in the storage device 106.

The risk assessment circuit 112 may periodically or continually access sensor data from the sensing devices 118, or other contextual information sources, such as a map database, a user appointment calendar, a location service (e.g., GPS), or the like to determine and maintain a risk rating score. The risk rating may be expressed in various forms and is used represent a relative risk of the environment. The risk rating reflects the user's current risk of injury, inconvenience, or other situations. The risk rating may be expressed as a percentage (e.g., 45% likely that something unwanted may happen), a quantitative score (e.g., 6 out of 10 rating), or a qualitative score ('more likely', 'not very likely', etc.).

The user context circuit 114 is used to determine the user's present state. The user context circuit 114 uses sensor data, user feedback, and other information, to determine the user's state. The result may indicate that the user is potentially under duress, mentally fatigued, asleep, intoxicated, exercising, or the like.

Based on the risk rating as determined by the risk assessment circuit 112, the user's context as determined by the user context circuit 114, and other variables, the coordinator device 102 may access the rule evaluation circuit 116 to determine a responsive action. The responsive action may involve relatively simple local actions, such as to begin recording audio at the user's location to document activities, or more complex actions, such as to notify emergency response personnel, sound a building alarm, and begin transmitting a location beacon.

The rule evaluation circuit 116 maintains multiple rules that map conditions as expressed by sensor values or user state, to one or more commands. The rule evaluation circuit 116 may implement one or more machine learning techniques. Using a data-driven solution, a training process may gather a large number of potential sensor values and other information, and correlate it to potential commands to execute. The machine learning technique may include an artificial neural network, a convolutional neural network, a genetic algorithm, a Bayesian network, or the other similar intelligent, probabilistic, or heuristical systems. Alternatively, the rule evaluation circuit 116 may implement a deterministic decision-making model that maps a number of input values to one or more responsive actions.

Based on the determination of the rule evaluation circuit 116, one or more responsive actions may be initiated. For example, a first responder 120 (e.g., fire department, ambulance, police, etc.) may be contacted to assist the user 104.

One example use case is when a person is walking through an unfamiliar location. The fact that the street is an unfamiliar street may be provided by user input (e.g., via user interface circuit 110) or from analytics (e.g., determining that the user has not been in this location in the previous year). As the person is walking, a risk rating may be determined and maintained. In this case, because the location is unfamiliar, the risk rating may be raised by some amount. The rise may be a proportional rise over a baseline, a percentage rise, an incremental increase, or other methods.

The person's pulse is periodically or continually sampled using a wrist-based device (e.g., smartwatch). A spike in heart rate may indicate that the person noticed something that alerted them. Perhaps another person is following him or perhaps a loud sound occurred in the distance. Regardless, the possible state of duress is noted by the user context circuit 114. A rule from the rule database may be access such that if the person's pulse increases over a certain heart beats per minute, then an additional sensor is enlisted for further development of the user's context. Several rules may be invoked based on a similar threshold. For example, one rule may indicate that if a person's heart rate increases over a threshold beats/minute, then an appointment calendar is accessed on the person's device to determine if the person has an appointment that explains the increase in heartrate (e.g., a workout session). Another rule may use the same condition (e.g., elevated heartrate) to trigger a different responsive action, which may be to access accelerometer data from the person's fitness monitor and determine if the person is exercising. Yet another rule may be accessed using the same condition, which may broadcast a discovery message to other sensors in the area in the event that such sensors may need to be enlisted.

Rules may cascade and invoke other rules. For example, if the previously discussed rules indicate that the person is not scheduled for a workout, that the person is not exercising, and that there are other sensors in the area, then a public camera may be enlisted by the sensor coordinator to begin recording footage of the person. This footage may be transmitted to the person's device or alternatively stored in a secure area for later access. The footage may ultimately capture the person being mugged, which may be useful for prosecution of the perpetrator.

In another user case example, a person may be hiking in a remote area without cellular or internet connectivity. In this situation, because the network connectivity is intermittent, there are times when internet storage or cloud computing resources are unavailable. In such times, the person's personal devices are the other available computing resources. As the person is hiking away from urban areas with coverage, the person's phone may periodically provide a location update to a cloud service. This provides a "last known location" for rescuers in the event that the person becomes lost or injured during the hike. If the hiker falls, accelerometer data from the phone may sense the event and respond based on a rule. The rule may indicate, at least in part, that if there is a sudden downward acceleration followed by a quick deceleration, a fall is likely, and if there is no further accelerometer data to indicate that the person got up and continued moving, then the phone may be set to a rescue mode. In rescue mode, the phone may periodically transmit a beacon to assist rescuers in finding the fallen hiker.

In another use case, a tier-one sensor is used to determine that the user is on a bicycle. The tier-one sensor may be an accelerometer incorporated into a user's smartphone or fitness wristband, for example. An additional tier-one sensor, a Bluetooth Low-Energy (BLE) transmitter, is used to determine that there are no indoor Bluetooth beacons, indicating that the user is biking outdoors. A GPS unit is accessed to determine that the user is biking on a known route, for example, a route that the user traverses regularly on a commute to work. A risk rating is set to a relatively low setting based on these data.

A traffic monitoring system may be accessed to determine automobile traffic in the area. If the traffic is deemed to be heavy, then the risk rating may be raised. Similarly, if the traffic is light, then the risk rating may be downgraded. Based on known traffic levels, the sensor coordination device may be set to a medium alert state. As such, when a user context indicates duress or distress of the user, certain responsive actions may be performed that are of a different set of actions than those that may be performed if the risk rating is set to a relatively high setting.

If there is sufficient battery charge on the user's phone, and appropriate hardware support, the phone may continuously record audio to capture signs of distress or environmental sounds that indicate an emergent situation. Honking horns, shouting, or certain keywords spoken by the user may elevate the risk rating to a high risk. For example, when a car cuts off the user on the bike, the user may shout, which is captured by the phone and the sensor coordinator revises the risk rating.

Sudden deceleration may indicate a crash, fall, or attempt to stop and avoid a collision. In this situation, depending on the rules incorporated into the sensor control device, one or more actions may be invoked, such as enlisting additional sensors to capture an accident or crime scene.

User interface controls may also be used. For example, a voice prompt may ask the user "Are you ok?" If the user responds in the affirmative, then the risk rating may be lowered and the user context state updated. If the user does not respond, then the voice prompt may be used again, if then if the user does not respond, other sensors may be used to determine whether the user is injured or unconscious.

The risk rating may dynamically increase and decrease during the user's bike ride. For example, as the user approaches an intersection with heavy traffic, the risk rating may be increased. Afterward, when the user is on vacant side streets, the risk rating may be decreased. As another example, if the user is approaching a neighborhood with a high crime statistic, then the risk rating may be increased.

When a high risk rating is determined, the rules and resultant actions may be altered. Additionally, when a high risk rating is determined, sensor gathering may be altered. For example, sensor values may be captured more frequently or continuously, sensor information may be captured at a higher fidelity or with more granularity, or additional sensors may be enlisted to capture more information. The increase in sensor usage is balanced against the power consumption, network requirements, and computational usage.

Thus, in various embodiments, the coordinator device 102 may include logic and circuitry, such as a sensor command unit 108, user interface circuit 110, risk assessment circuit 112, user context circuit 114, and rule evaluation circuit 116, to access data from sensors 118 or storage device 106, and perform context-based responses.

In an embodiment, the sensor command circuit 108 is to access first-tier sensor data from a first-tier sensor associated with a user. It is understood that any type of sensor data is included in the scope of first-tier sensor data and other tiers of sensor data, such as video, biometric, environmental, audio, motion data, and the like. In an embodiment, the first-tier sensor data comprises biometric data, accelerometer data, or audio data. In an embodiment, the first-tier sensor is incorporated into a user device. In a further embodiment, the user device comprises a smartphone.

The risk assessment circuit 112 is to use the first-tier sensor data to determine a risk rating, the risk rating representing a potential risk to the user. In an embodiment, to use the first-tier sensor data to determine the risk rating, the risk assessment circuit is to identify a location of the user and set the risk rating based on the location. In an embodiment, the risk rating is a quantitative value. In a related embodiment, the risk rating is a numerical value. In a related embodiment, the risk rating is a qualitative value. In a further embodiment, the user interface circuit 110 is to present the risk rating to the user.

The user context circuit 114 is to determine a user context from the first-tier sensor data, where the user context circuit and the sensor command circuit are to selectively access second-tier sensor data from a second-tier sensor based on the user context. In an embodiment, to determine the user context from the first-tier sensor data, the user context circuit 114 is to access geographic positioning data from the first-tier sensor data and identify a location of the user. In a related embodiment, to determine the user context from the first-tier sensor data, the user context circuit 114 is to access accelerometer data from the first-tier sensor data; and identify an activity of the user. In a related embodiment, to determine the user context from the first-tier sensor data, the user context circuit 114 is to access an appointment calendar entry associated with the user and identify a planned activity of the user.

In an embodiment, to selectively access second-tier sensor data from the second-tier sensor based on the user context, the user context circuit 114 is to determine that the user context indicates that the user is in distress, determine a resource level of the second-tier sensor, use a cost-benefit analysis to analyze the user context in view of the resource level, and access the second-tier sensor data when the cost-benefit analysis indicates that the benefit outweighs the cost.

The rule evaluation circuit 116 is to access a rule database to identify a rule corresponding to the risk rating and user context, and execute the rule when the rule is identified. In an embodiment, to access the rule database to identify the rule corresponding to the risk rating and user context, the rule evaluation circuit 116 is to access a cloud-based rule database to identify the rule.

In a related embodiment, to access the rule database to identify the rule corresponding to the risk rating and user context, the rule evaluation circuit 116 is to query the rule database using the risk rating and user context as query parameters, to produce query results and retrieve the rule corresponding to the risk rating and user context from the query results.

In an embodiment, to execute the rule when the rule is identified the rule evaluation circuit 116 is to perform at least one operation comprising: recording audio in an environment around the user, recording video in the environment around the user, contacting emergency response personnel, or transmitting a location beacon.

Figure 2:
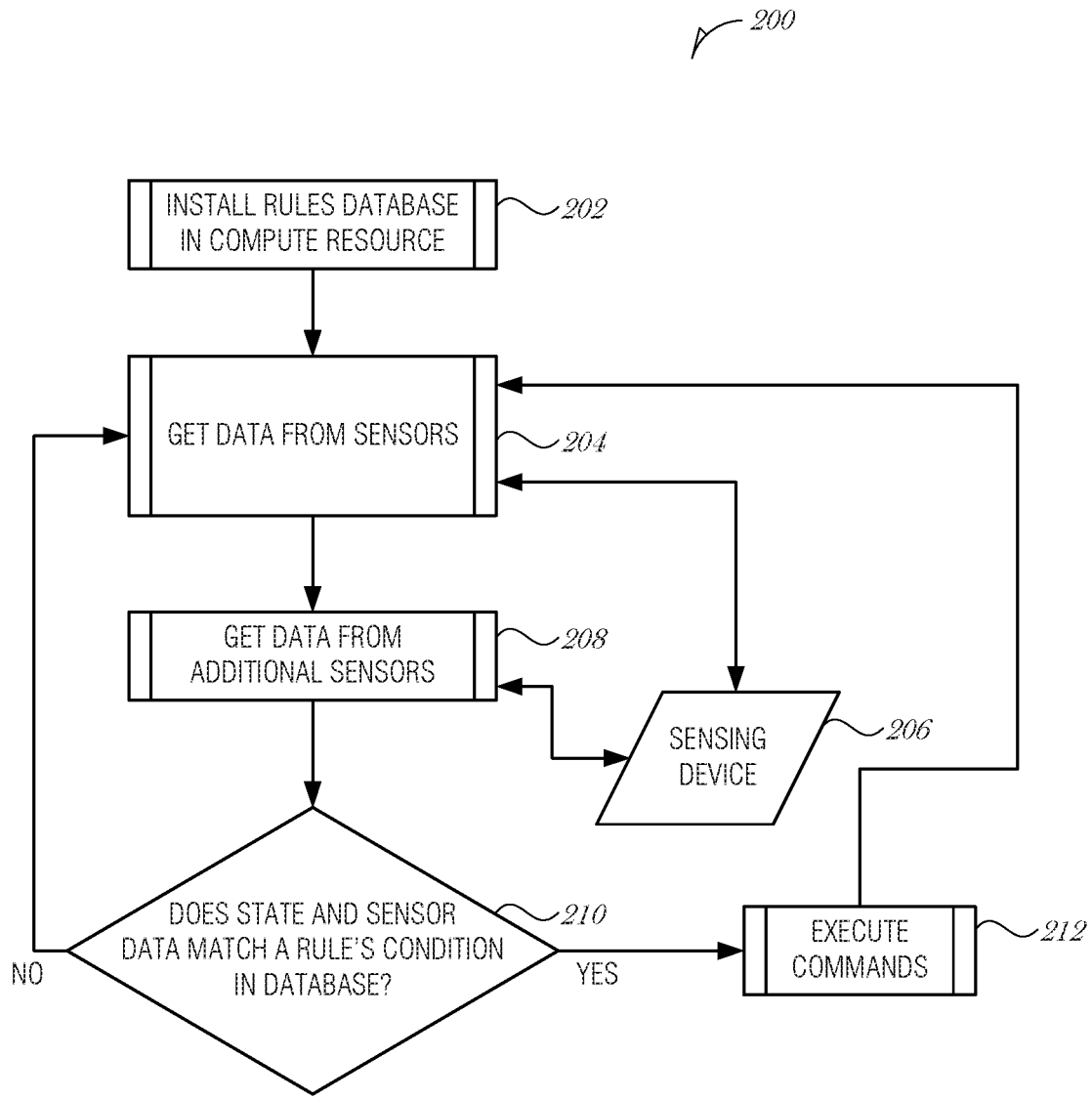
FIG. 2 is a control and data flow diagram illustrating sensor data processing, according to an embodiment.

FIG. 2 is a control and data flow diagram illustrating sensor data processing 200, according to an embodiment. A rules database may be installed in a compute device (operation 202). For example, a baseline rules database may be installed in a coordinator device 102, as depicted and described in FIG. 1. The baseline rules database may be an initial configuration of rules that map conditions to actions (e.g., for an observed or sensed condition, perform the associated action, which may be a compound action). The rules database may be modified over time, such as with user feedback or through a machine learning process.

Data is obtained from one or more sensing devices 206 (operation 204). Depending on the risk rating, user context, and other information, additional sensor data may be collected (operation 208). Using the available sensor information, one or more rules may be identified and evaluated (decision block 210). If the sensor information matches or closely correlates with a rule's condition, then the associated actions are executed at 212. Alternatively, if a rule cannot be identified or the conditions of a rule are not met, then the process 200 returns to operation 204 to continue receiving or accessing sensor data.

Sensor coordination may be implemented as a network resource (e.g., a cloud service) Similarly, the rules database may be provisioned to a network resource or stored in a network-accessible location (e.g., cloud storage).

Various embodiments will be discussed in the following sections. It is understood that such embodiments are not constrained to the particulars of either figure and that the mechanisms described may be extended or adapted to any environment.

Figure 3:
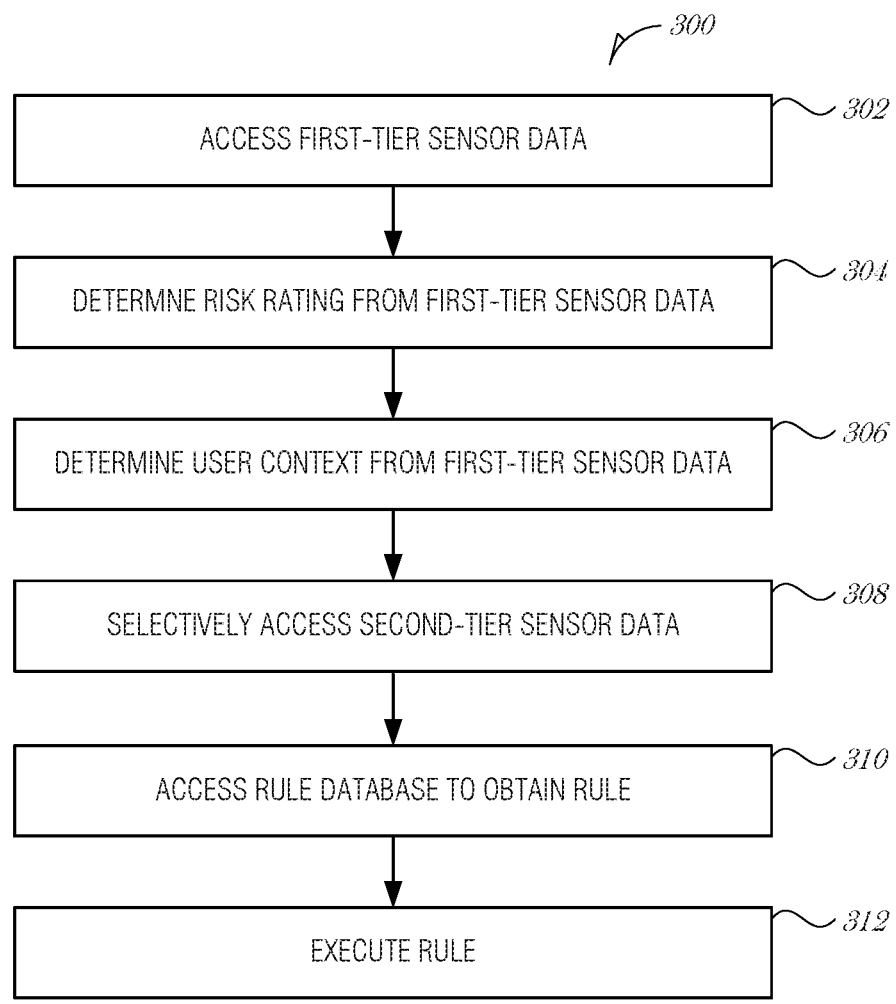
FIG. 3 is a flowchart illustrating a method for providing sensor collaboration, according to an embodiment.

FIG. 3 is a flowchart illustrating a method 300 for providing sensor collaboration, according to an embodiment. At block 302, first-tier sensor data from a first-tier sensor associated with a user is accessed. In an embodiment, the first-tier sensor data comprises biometric data, accelerometer data, or audio data.

In an embodiment, the first-tier sensor is incorporated into a user device. In a further embodiment, the user device comprises a smartphone.

At block 304, the first-tier sensor data is used to determine a risk rating, the risk rating representing a potential risk to the user. In an embodiment, using the first-tier sensor data to determine the risk rating comprises identifying a location of the user and setting the risk rating based on the location.

In an embodiment, the risk rating is a quantitative value. In a further embodiment, the risk rating is a numerical value. In a related embodiment, the risk rating is a qualitative value. In a related embodiment, the method 300 includes presenting the risk rating to the user.

At block 306, a user context is determined from the first-tier sensor data. In an embodiment, determining the user context from the first-tier sensor data comprises accessing geographic positioning data from the first-tier sensor data and identifying a location of the user.

In an embodiment, determining the user context from the first-tier sensor data comprises accessing accelerometer data from the first-tier sensor data and identifying an activity of the user.

In an embodiment, determining the user context from the first-tier sensor data comprises accessing an appointment calendar entry associated with the user and identifying a planned activity of the user.

At block 308, second-tier sensor data from a second-tier sensor is selectively accessed based on the user context. In an embodiment, selectively accessing second-tier sensor data from the second-tier sensor based on the user context comprises determining that the user context indicates that the user is in distress, determining a resource level of the second-tier sensor, using a cost-benefit analysis to analyze the user context in view of the resource level, and accessing the second-tier sensor data when the cost-benefit analysis indicates that the benefit outweighs the cost.

At block 310, a rule database is accessed to identify a rule corresponding to the risk rating and user context. In an embodiment, accessing the rule database to identify the rule corresponding to the risk rating and user context comprises accessing a cloud-based rule database to identify the rule.

In an embodiment, accessing the rule database to identify the rule corresponding to the risk rating and user context comprises querying the rule database using the risk rating and user context as query parameters, to produce query results and retrieving the rule corresponding to the risk rating and user context from the query results.

At block 312, the rule is executed when the rule is identified. In an embodiment, executing the rule when the rule is identified comprises, performing at least one operation comprising recording audio in an environment around the user, recording video in the environment around the user, contacting emergency response personnel, or transmitting a location beacon.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

Figure 4:
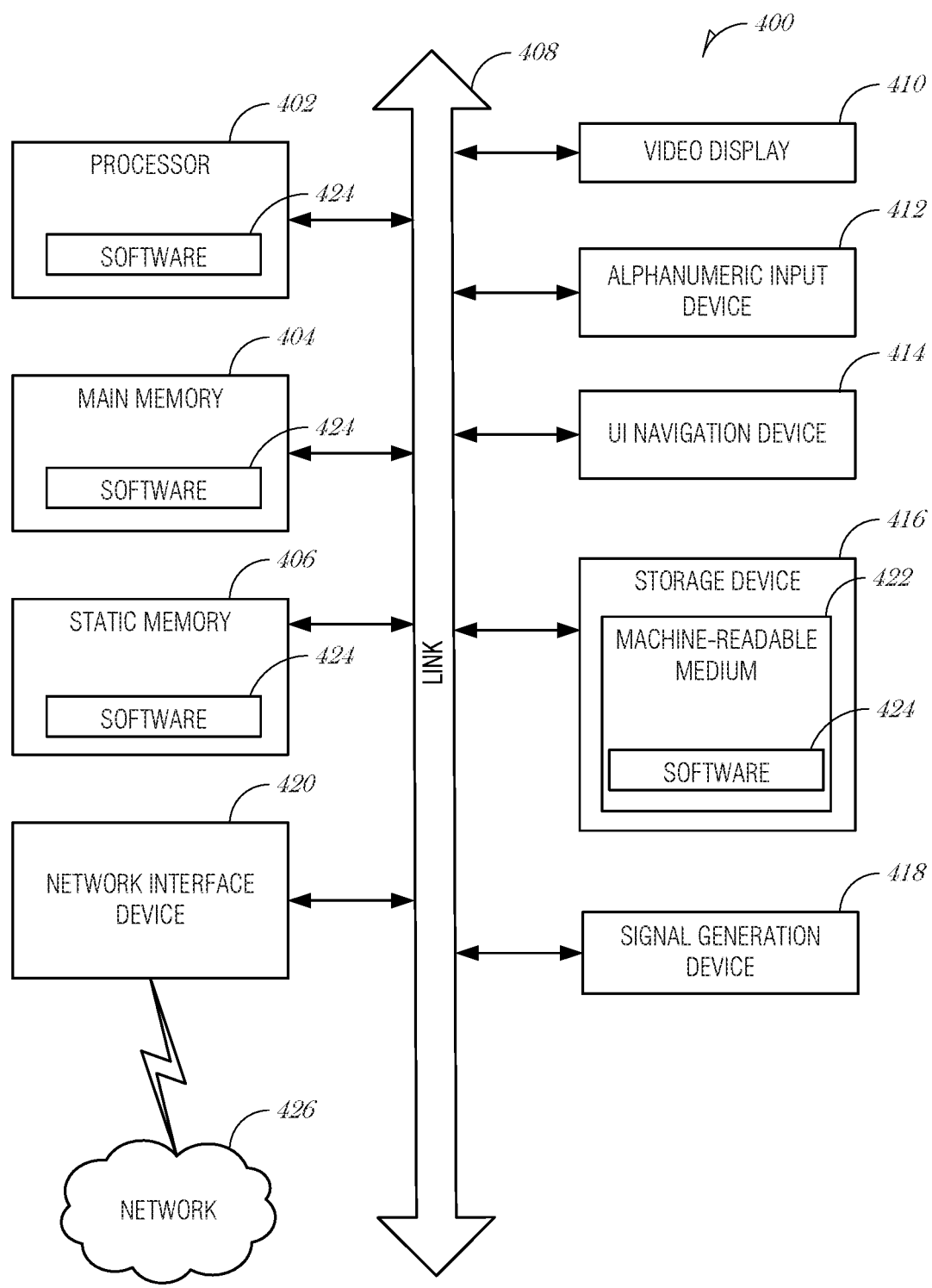
FIG. 4 is a block diagram illustrating an example machine upon which any one or more of the techniques (e.g., methodologies) discussed herein may perform, according to an example embodiment.

FIG. 4 is a block diagram illustrating a machine in the example form of a computer system 400, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 400 includes at least one processor 402 (e.g., a central processing unit (CPU), a graphics processing unit (GPU) or both, processor cores, compute nodes, etc.), a main memory 404 and a static memory 406, which communicate with each other via a link 408 (e.g., bus). The computer system 400 may further include a video display unit 410, an alphanumeric input device 412 (e.g., a keyboard), and a user interface (UI) navigation device 414 (e.g., a mouse). In one embodiment, the video display unit 410, input device 412 and UI navigation device 414 are incorporated into a touch screen display. The computer system 400 may additionally include a storage device 416 (e.g., a drive unit), a signal generation device 418 (e.g., a speaker), a network interface device 420, and one or more sensors (not shown), such as a global positioning system (GPS) sensor, compass, accelerometer, gyrometer, magnetometer, or other sensor.

The storage device 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404, static memory 406, and/or within the processor 402 during execution thereof by the computer system 400, with the main memory 404, static memory 406, and the processor 402 also constituting machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 includes subject matter for providing sensor collaboration (such as a device, apparatus, or machine) comprising: a sensor command circuit to access first-tier sensor data from a first-tier sensor associated with a user; a risk assessment circuit to use the first-tier sensor data to determine a risk rating, the risk rating representing a potential risk to the user; a user context circuit to determine a user context from the first-tier sensor data, wherein the user context circuit and the sensor command circuit are to selectively access second-tier sensor data from a second-tier sensor based on the user context; and a rule evaluation circuit to access a rule database to identify a rule corresponding to the risk rating and user context, and execute the rule when the rule is identified.

In Example 2, the subject matter of Example 1 may include, wherein the first-tier sensor data comprises biometric data, accelerometer data, or audio data.

In Example 3, the subject matter of any one of Examples 1 to 2 may include, wherein the first-tier sensor is incorporated into a user device.

In Example 4, the subject matter of any one of Examples 1 to 3 may include, wherein the user device comprises a smartphone.

In Example 5, the subject matter of any one of Examples 1 to 4 may include, wherein to use the first-tier sensor data to determine the risk rating, the risk assessment circuit is to: identify a location of the user; and set the risk rating based on the location.

In Example 6, the subject matter of any one of Examples 1 to 5 may include, wherein the risk rating is a quantitative value.

In Example 7, the subject matter of any one of Examples 1 to 6 may include, wherein the risk rating is a numerical value.

In Example 8, the subject matter of any one of Examples 1 to 7 may include, wherein the risk rating is a qualitative value.

In Example 9, the subject matter of any one of Examples 1 to 8 may include, a user interface circuit to present the risk rating to the user.

In Example 10, the subject matter of any one of Examples 1 to 9 may include, wherein to determine the user context from the first-tier sensor data, the user context circuit is to: access geographic positioning data from the first-tier sensor data; and identify a location of the user.

In Example 11, the subject matter of any one of Examples 1 to 10 may include, wherein to determine the user context from the first-tier sensor data, the user context circuit is to: access accelerometer data from the first-tier sensor data; and identify an activity of the user.

In Example 12, the subject matter of any one of Examples 1 to 11 may include, wherein to determine the user context from the first-tier sensor data, the user context circuit is to: access an appointment calendar entry associated with the user; and identify a planned activity of the user.

In Example 13, the subject matter of any one of Examples 1 to 12 may include, wherein to selectively access second-tier sensor data from the second-tier sensor based on the user context, the user context circuit is to: determine that the user context indicates that the user is in distress; determine a resource level of the second-tier sensor; use a cost-benefit analysis to analyze the user context in view of the resource level; and access the second-tier sensor data when the cost-benefit analysis indicates that the benefit outweighs the cost.

In Example 14, the subject matter of any one of Examples 1 to 13 may include, wherein to access the rule database to identify the rule corresponding to the risk rating and user context, the rule evaluation circuit is to access a cloud-based rule database to identify the rule.

In Example 15, the subject matter of any one of Examples 1 to 14 may include, wherein to access the rule database to identify the rule corresponding to the risk rating and user context, the rule evaluation circuit is to: query the rule database using the risk rating and user context as query parameters, to produce query results; and retrieve the rule corresponding to the risk rating and user context from the query results.

In Example 16, the subject matter of any one of Examples 1 to 15 may include, wherein to execute the rule when the rule is identified the rule evaluation circuit is to perform at least one operation recording audio in an environment around the user, recording video in the environment around the user, contacting emergency response personnel, or transmitting a location beacon.

Example 17 includes subject matter for providing sensor collaboration (such as a method, means for performing acts, machine readable medium including instructions that when performed by a machine cause the machine to performs acts, or an apparatus to perform) comprising: accessing first-tier sensor data from a first-tier sensor associated with a user; using the first-tier sensor data to determine a risk rating, the risk rating representing a potential risk to the user; determining a user context from the first-tier sensor data; selectively accessing second-tier sensor data from a second-tier sensor based on the user context; accessing a rule database to identify a rule corresponding to the risk rating and user context; and executing the rule when the rule is identified.

In Example 18, the subject matter of Example 17 may include, wherein the first-tier sensor data comprises biometric data, accelerometer data, or audio data.

In Example 19, the subject matter of any one of Examples 17 to 18 may include, wherein the first-tier sensor is incorporated into a user device.

In Example 20, the subject matter of any one of Examples 17 to 19 may include, wherein the user device comprises a smartphone.

In Example 21, the subject matter of any one of Examples 17 to 20 may include, wherein using the first-tier sensor data to determine the risk rating comprises: identifying a location of the user; and setting the risk rating based on the location.

In Example 22, the subject matter of any one of Examples 17 to 21 may include, wherein the risk rating is a quantitative value.

In Example 23, the subject matter of any one of Examples 17 to 22 may include, wherein the risk rating is a numerical value.

In Example 24, the subject matter of any one of Examples 17 to 23 may include, wherein the risk rating is a qualitative value.

In Example 25, the subject matter of any one of Examples 17 to 24 may include, presenting the risk rating to the user.

In Example 26, the subject matter of any one of Examples 17 to 25 may include, wherein determining the user context from the first-tier sensor data comprises: accessing geographic positioning data from the first-tier sensor data; and identifying a location of the user.

In Example 27, the subject matter of any one of Examples 17 to 26 may include, wherein determining the user context from the first-tier sensor data comprises: accessing accelerometer data from the first-tier sensor data; and identifying an activity of the user.

In Example 28, the subject matter of any one of Examples 17 to 27 may include, wherein determining the user context from the first-tier sensor data comprises: accessing an appointment calendar entry associated with the user; and identifying a planned activity of the user.

In Example 29, the subject matter of any one of Examples 17 to 28 may include, wherein selectively accessing second-tier sensor data from the second-tier sensor based on the user context comprises: determining that the user context indicates that the user is in distress; determining a resource level of the second-tier sensor; using a cost-benefit analysis to analyze the user context in view of the resource level; and accessing the second-tier sensor data when the cost-benefit analysis indicates that the benefit outweighs the cost.

In Example 30, the subject matter of any one of Examples 17 to 29 may include, wherein accessing the rule database to identify the rule corresponding to the risk rating and user context comprises accessing a cloud-based rule database to identify the rule.

In Example 31, the subject matter of any one of Examples 17 to 30 may include, wherein accessing the rule database to identify the rule corresponding to the risk rating and user context comprises: querying the rule database using the risk rating and user context as query parameters, to produce query results; and retrieving the rule corresponding to the risk rating and user context from the query results.

In Example 32, the subject matter of any one of Examples 17 to 31 may include, wherein executing the rule when the rule is identified comprises, performing at least one operation recording audio in an environment around the user, recording video in the environment around the user, contacting emergency response personnel, or transmitting a location beacon.

Example 33 includes at least one machine-readable medium including instructions, which when executed by a machine, cause the machine to perform operations of any of the Examples 17-32.

Example 34 includes an apparatus comprising means for performing any of the Examples 17-32.

Example 35 includes subject matter for providing sensor collaboration (such as a device, apparatus, or machine) comprising: accessing first-tier sensor data from a first-tier sensor associated with a user; using the first-tier sensor data to determine a risk rating, the risk rating representing a potential risk to the user; determining a user context from the first-tier sensor data; selectively accessing second-tier sensor data from a second-tier sensor based on the user context; accessing a rule database to identify a rule corresponding to the risk rating and user context; and executing the rule when the rule is identified.

In Example 36, the subject matter of Example 35 may include, wherein the first-tier sensor data comprises biometric data, accelerometer data, or audio data.

In Example 37, the subject matter of any one of Examples 35 to 36 may include, wherein the first-tier sensor is incorporated into a user device.

In Example 38, the subject matter of any one of Examples 35 to 37 may include, wherein the user device comprises a smartphone.

In Example 39, the subject matter of any one of Examples 35 to 38 may include, wherein the means for using the first-tier sensor data to determine the risk rating comprise: means for identifying a location of the user; and means for setting the risk rating based on the location.

In Example 40, the subject matter of any one of Examples 35 to 39 may include, wherein the risk rating is a quantitative value.

In Example 41, the subject matter of any one of Examples 35 to 40 may include, wherein the risk rating is a numerical value.

In Example 42, the subject matter of any one of Examples 35 to 41 may include, wherein the risk rating is a qualitative value.

In Example 43, the subject matter of any one of Examples 35 to 42 may include, means for presenting the risk rating to the user.

In Example 44, the subject matter of any one of Examples 35 to 43 may include, wherein the means for determining the user context from the first-tier sensor data comprise: means for accessing geographic positioning data from the first-tier sensor data; and means for identifying a location of the user.

In Example 45, the subject matter of any one of Examples 35 to 44 may include, wherein the means for determining the user context from the first-tier sensor data comprise: means for accessing accelerometer data from the first-tier sensor data; and means for identifying an activity of the user.

In Example 46, the subject matter of any one of Examples 35 to 45 may include, wherein the means for determining the user context from the first-tier sensor data comprise: means for accessing an appointment calendar entry associated with the user; and means for identifying a planned activity of the user.

In Example 47, the subject matter of any one of Examples 35 to 46 may include, wherein the means for selectively accessing second-tier sensor data from the second-tier sensor based on the user context comprise: means for determining that the user context indicates that the user is in distress; means for determining a resource level of the second-tier sensor; means for using a cost-benefit analysis to analyze the user context in view of the resource level; and means for accessing the second-tier sensor data when the cost-benefit analysis indicates that the benefit outweighs the cost.

In Example 48, the subject matter of any one of Examples 35 to 47 may include, wherein the means for accessing the rule database to identify the rule corresponding to the risk rating and user context comprise means for accessing a cloud-based rule database to identify the rule.

In Example 49, the subject matter of any one of Examples 35 to 48 may include, wherein the means for accessing the rule database to identify the rule corresponding to the risk rating and user context comprise: means for querying the rule database using the risk rating and user context as query parameters, to produce query results; and means for retrieving the rule corresponding to the risk rating and user context from the query results.

In Example 50, the subject matter of any one of Examples 35 to 49 may include, wherein the means for executing the rule when the rule is identified comprises, performing at least one operation means for recording audio in an environment around the user, means for recording video in the environment around the user, means for contacting emergency response personnel, or means for transmitting a location beacon.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for providing sensor collaboration, the system comprising:
    a sensor command circuit to access first-tier sensor data from a first-tier sensor associated with a user;
    a risk assessment circuit to use the first-tier sensor data to determine a risk rating, the risk rating representing a potential risk to the user;
    a user context circuit to determine a user context from the first-tier sensor data, wherein the user context circuit and the sensor command circuit are to selectively access second-tier sensor data from a second-tier sensor based on the user context, wherein to selectively access second-tier sensor data from the second-tier sensor based on the user context, the user context circuit is to:
    determine that the user context indicates that the user is in distress;
    broadcast a discovery protocol message to determine an existence, a type, or a location, of sensor devices in proximity of the user, the sensor devices including the second-tier sensor, wherein the second-tier sensor is a publicly-available sensor installed on a premises;
    determine an available computational, network, or power supply resource level the second-tier sensor;
    use a cost-benefit analysis to analyze the user context in view of the available computational, network, or power supply resource level; and
    access the second-tier sensor data when the cost-benefit analysis indicates that the benefit outweighs the cost; and
    a rule evaluation circuit to access a rule database to identify a rule corresponding to the risk rating and user context, and execute the rule when the rule is identified.

2. The system of claim 1, wherein the first-tier sensor data comprises biometric data, accelerometer data, or audio data.

3. The system of claim 1, wherein the first-tier sensor is incorporated into a user device.

4. The system of claim 3, wherein the user device comprises a smartphone.

5. The system of claim 1, wherein to use the first-tier sensor data to determine the risk rating, the risk assessment circuit is to:
    identify a location of the user; and
    set the risk rating based on the location.

6. The system of claim 1, further comprising a user interface circuit to present the risk rating to the user.

7. The system of claim 1, wherein to determine the user context from the first-tier sensor data, the user context circuit is to:

access geographic positioning data from the first-tier sensor data; and
identify a location of the user.

8. The system of claim 1, wherein to determine the user context from the first-tier sensor data, the user context circuit is to:
access accelerometer data from the first-tier sensor data; and
identify an activity of the user.

9. The system of claim 1, wherein to determine the user context from the first-tier sensor data, the user context circuit is to:
access an appointment calendar entry associated with the user; and
identify a planned activity of the user.

10. The system of claim 1, wherein to access the rule database to identify the rule corresponding to the risk rating and user context, the rule evaluation circuit is to access a cloud-based rule database to identify the rule.

11. The system of claim 1, wherein to access the rule database to identify the rule corresponding to the risk rating and user context, the rule evaluation circuit is to:
query the rule database using the risk rating and user context as query parameters, to produce query results; and
retrieve the rule corresponding to the risk rating and user context from the query results.

12. A method for providing sensor collaboration, the method comprising:
accessing first-tier sensor data from a first-tier sensor associated with a user;
using the first-tier sensor data to determine a risk rating, the risk rating representing a potential risk to the user;
determining a user context from the first-tier sensor data;
selectively accessing second-tier sensor data from a second-tier sensor based on the user context, wherein selectively accessing comprises:
determining that the user context indicates that the user is in distress;
broadcasting a discovery protocol message to determine an existence, a type, or a location, of sensor devices in proximity of the user, the sensor devices including the second-tier sensor, wherein the second-tier sensor is a publicly-available sensor installed on a premises;
determining an available computational, network, or power supply resource level of the second-tier sensor;
using a cost-benefit analysis to analyze the user context in view of the available computational, network, or power supply resource level; and
accessing the second-tier sensor data when the cost-benefit analysis indicates that the benefit outweighs the cost;
accessing a rule database to identify a rule corresponding to the risk rating and user context; and
executing the rule when the rule is identified.

13. The method of claim 12, wherein the first-tier sensor data comprises biometric data, accelerometer data, or audio data.

14. The method of claim 12, wherein using the first-tier sensor data to determine the risk rating comprises:
identifying a location of the user; and
setting the risk rating based on the location.

15. The method of claim 12, wherein the risk rating is a quantitative value.

16. The method of claim 12, further comprising: presenting the risk rating to the user.

17. The method of claim 12, wherein determining the user context from the first-tier sensor data comprises:
accessing geographic positioning data from the first-tier sensor data; and
identifying a location of the user.

18. The method of claim 12, wherein determining the user context from the first-tier sensor data comprises:
accessing accelerometer data from the first-tier sensor data; and
identifying an activity of the user.

19. The method of claim 12, wherein determining the user context from the first-tier sensor data comprises:
accessing an appointment calendar entry associated with the user; and
identifying a planned activity of the user.

20. The method of claim 12, wherein accessing the rule database to identify the rule corresponding to the risk rating and user context comprises accessing a cloud-based rule database to identify the rule.

21. The method of claim 12, wherein accessing the rule database to identify the rule corresponding to the risk rating and user context comprises:
querying the rule database using the risk rating and user context as query parameters, to produce query results; and
retrieving the rule corresponding to the risk rating and user context from the query results.

22. The method of claim 12, wherein executing the rule when the rule is identified comprises, performing at least one operation comprising:
recording audio in an environment around the user,
recording video in the environment around the user,
contacting emergency response personnel, or
transmitting a location beacon.

23. At least one non-transitory machine-readable medium including instructions for providing sensor collaboration, which when executed by a machine, cause the machine to:
access first-tier sensor data from a first-tier sensor associated with a user;
use the first-tier sensor data to determine a risk rating, the risk rating representing a potential risk to the user;
determine a user context from the first-tier sensor data;
selectively access second-tier sensor data from a second-tier sensor based on the user context, wherein the operations to selectively access second-tier sensor data include the operations to:
determine that the user context indicates that the user is in distress;
broadcast a discovery protocol message to determine an existence, a type, or a location, of sensor devices in proximity of the user, the sensor devices including the second-tier sensor, wherein the second-tier sensor is a publicly-available sensor installed on a premises;
determine an available computational, network, or power supply resource level of the second-tier sensor;
use a cost-benefit analysis to analyze the user context in view of the available computational, network, or power supply resource level; and
access the second-tier sensor data when the cost-benefit analysis indicates that the benefit outweighs the cost;

access a rule database to identify a rule corresponding to the risk rating and user context; and execute the rule when the rule is identified.

\* \* \* \* \*

UNITED STATES PATENT AND TRADEMARK OFFICE
CERTIFICATE OF CORRECTION

PATENT NO. : 11,283,873 B2
APPLICATION NO. : 16/087965
DATED : March 22, 2022
INVENTOR(S) : Corrion et al.

Page 1 of 1

It is certified that error appears in the above-identified patent and that said Letters Patent is hereby corrected as shown below:

In the Claims

In Column 16, Line 42, in Claim 1, after "level", insert --of--

In Column 17, Lines 48-49, in Claim 12, delete "sensor:" and insert --sensor;-- therefor Signed and Sealed this
Twenty-first Day of June, 2022

Katherine Kelly Vidal
*Director of the United States Patent and Trademark Office*